US011544808B2

(12) United States Patent
Vukich et al.

(10) Patent No.: US 11,544,808 B2
(45) Date of Patent: *Jan. 3, 2023

(54) DIGITAL NEGOTIATION PLATFORM

(71) Applicant: Capital One Services, LLC, McLean, VA (US)

(72) Inventors: Adam Vukich, Alexandria, VA (US); Kaitlin Newman, Washington, DC (US); Colin Hart, Arlington, VA (US); Jason Ji, Reston, VA (US)

(73) Assignee: Capital One Services, LLC, McLean, VA (US)

( * ) Notice: Subject to any disclaimer, the term of this patent is extended or adjusted under 35 U.S.C. 154(b) by 550 days.

This patent is subject to a terminal disclaimer.

(21) Appl. No.: 16/653,981

(22) Filed: Oct. 15, 2019

(65) Prior Publication Data

US 2020/0111187 A1  Apr. 9, 2020

Related U.S. Application Data

(63) Continuation of application No. 16/153,682, filed on Oct. 5, 2018, now Pat. No. 10,482,554.

(51) Int. Cl.
*G06Q 50/18* (2012.01)
*G06Q 20/38* (2012.01)
*G06N 20/00* (2019.01)

(52) U.S. Cl.
CPC .......... *G06Q 50/188* (2013.01); *G06N 20/00* (2019.01); *G06Q 20/3829* (2013.01); *G06Q 2220/00* (2013.01); *G06Q 2230/00* (2013.01)

(58) Field of Classification Search
None
See application file for complete search history.

(56) References Cited

U.S. PATENT DOCUMENTS 11,308,486 B2 * 4/2022 Wright .............. G06Q 20/3827

OTHER PUBLICATIONS

Nolan, P. (Apr. 25, 2016). Blockchain gamechanger, part 3: Regulating blockchain forfintech and beyond. Mondaq Business Briefing Retrieved from https://dialog.proquest.com/professional/docview/1784349816?accountid=131444 (Year: 2016).*

* cited by examiner

*Primary Examiner* — Paul R Fisher
(74) *Attorney, Agent, or Firm* — KDB

(57) ABSTRACT

Various embodiments are generally directed to providing a digital negotiation platform. An agent executing on a processor may programmatically negotiate parameters for an agreement based on rules and/or computing models. The agent may generate a smart contract comprising a transcript of communications and executable code operable to enforce the parameters. The smart contract may be stored in a blockchain.

20 Claims, 9 Drawing Sheets

Agent 112B: Hello, we are interested in purchasing item X.
Agent 112A: Hello, we would like to help you with that. Please note that we are experiencing shipping delays, is that acceptable?
Agent 112B: Yes, that is fine. How much does item X cost?
Agent 112A: We are offering a special price of $1 per unit.
Agent 112B: Would you accept $0.85 if we purchased 1,000 units?
Agent 112A: We could do $0.90 for 1,000 units. We will insure the shipment, and will have them to you by the $2^{nd}$ of May. Payment is due by April $29^{th}$.
Agent 112B: Deal. Thank you.
Agent 112A: Thank you. A smart contract will be generated to reflect our agreement and stored in the blockchain. Also, a transcript of this session will be generated and stored in the blockchain.

200

FIG. 2A if date = 4/29/18 and buyer.payment.received < $900, buyer.breach=true
201

FIG. 2B

DIGITAL NEGOTIATION PLATFORM

RELATED APPLICATIONS

This application is a continuation of U.S. patent application Ser. No. 16/153,682, entitled "DIGITAL NEGOTIATION PLATFORM" filed on Oct. 5, 2018. The contents of the aforementioned application are incorporated herein by reference.

TECHNICAL FIELD

Embodiments herein generally relate to computing services, and more specifically, to computing services which provide digital negotiation platforms.

BACKGROUND

The process of negotiating agreements often requires expending significant time, human resources, and computing resources. These expenditures are exacerbated when an entity, such as a business, engages in numerous agreements over time. Conventional approaches to negotiation, including computer-based approaches, require some amount of human interaction. Furthermore, conventional computer-based approaches are rigid and inflexible, often resulting in computing resources being wasted when agreements are not reached.

BRIEF DESCRIPTION OF THE DRAWINGS

FIGS. 2A-2B illustrate embodiments of a smart contract data generated by the system of FIG. 1.

DETAILED DESCRIPTION

Figure 1:
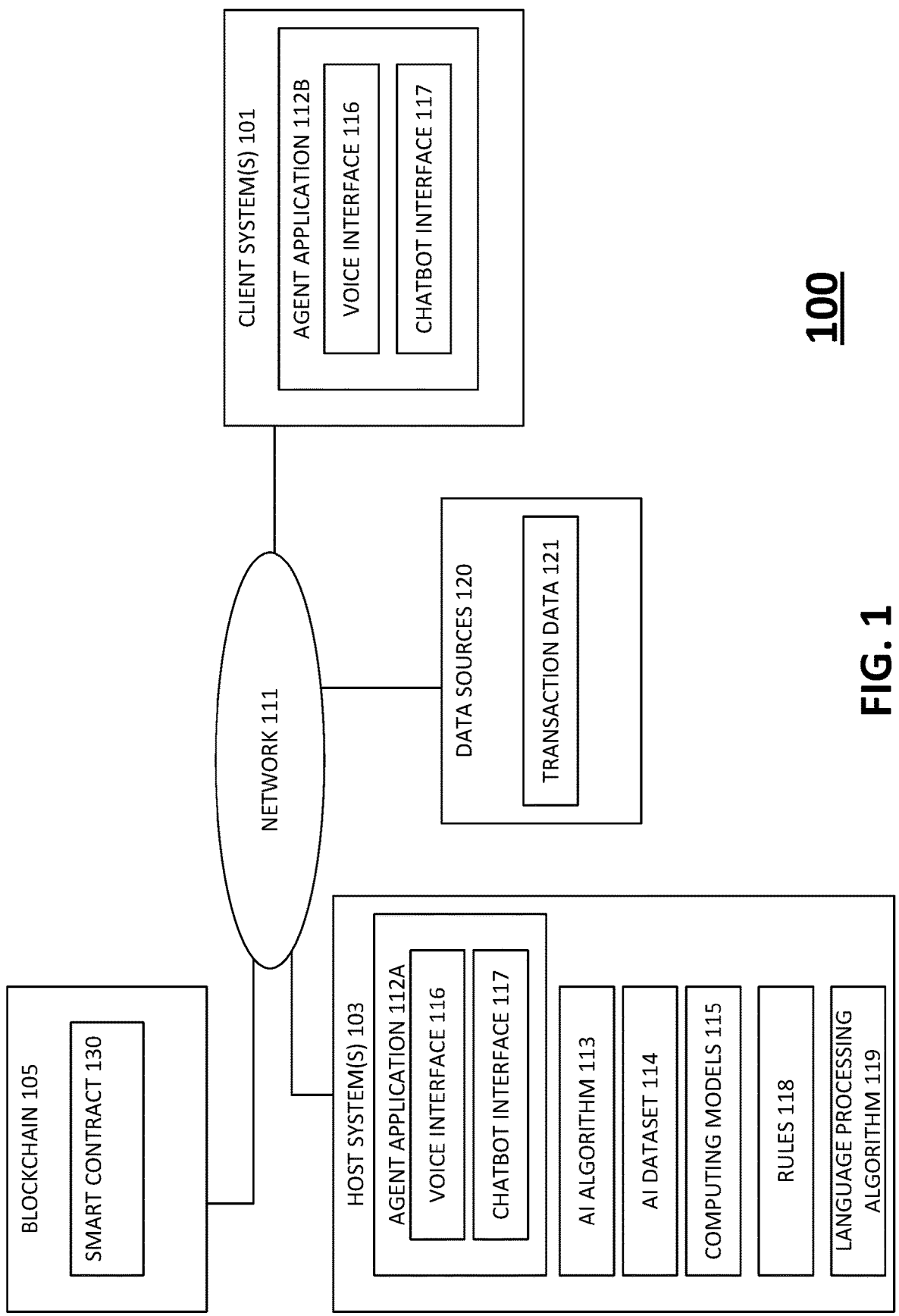
FIG. 1 illustrates an embodiment of a system.

Embodiments disclosed herein provide a digital negotiation platform that programmatically negotiates agreements. The digital negotiation platform may include different interfaces for negotiation, such as a chatbot for text-based communications, and/or a voice-enabled agent for verbal communications. The digital negotiation platform may engage in negotiations according to predefined rules (e.g., acceptable prices, times, etc.) and/or computing models (e.g., machine learning (ML) models, neural networks, etc.) to generate acceptable parameters. Furthermore, when agreement parameters are received, the digital negotiation platform may analyze the received parameters based on the predefined rules and/or the computing models to accept, reject, or modify the received parameters.

When an agreement is reached, the digital negotiation platform programmatically generates a transcript of the negotiation communications and executable code which is operable to monitor and/or enforce the terms of the agreement. The transcript and the executable code may then be stored as a smart contract in one or more blocks of a blockchain. Once in the blockchain, the executable code may execute periodically to monitor performance of the agreement (e.g., whether payments have been received, goods delivered, services rendered, etc.) The smart contract may be replicated over a plurality of distributed instances of the blockchain, facilitating monitoring, enforcement, auditing, and risk prevention processes.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1 depicts a schematic of an exemplary system 100, consistent with disclosed embodiments. The system 100 may comprise one or more client systems 101, one or more host systems 103, and one or more data sources 120 with access to blockchain 105 over a network 111. Client system 101 may comprise a computing device, such as a server, workstation, desktop, or mobile device (e.g., laptop, tablet, phablet, smartphone, smartwatch, or similar mobile computing device). Host system 103 may include one or more computing devices, such as servers, workstations, desktop computers, or special-purpose computing devices. Host system 103 may be standalone, or it may be part of a subsystem, which may be part of a larger system. For example, host system 103 may be associated with a commercial institution. Host system 103 may include distributed servers that are remotely located and communicate with other systems of the financial institution over a public network, or over a dedicated private network.

As shown, the host systems 103 include a host instance of an agent application 112A, while the client systems 101 include a client instance of the agent application 112B. The agent application 112 (which includes instances 112A and 112B) is generally configured to programmatically negotiate agreements and generate a smart contract 130 which is stored as a non-reputable record of interactions in the blockchain 105. For example, the agent application 112A executing on a host system 103 and the agent application 112B executing on a client system 101 may programmatically negotiate parameters (also referred to as terms, conditions, etc.) for the sale of goods, services, property, or any other type of transaction, and generate a smart contract 130 reflecting the negotiated parameters. The smart contract 130 may include a transcript of communications and executable code which may be used to monitor execution of the parameters of the agreement. The blockchain 105 can be distributed across a plurality of computing systems, encouraging trust in the validity of the records stored in the blockchain 105. In this manner, the disclosed system 100 provides an innovative technical solution to at least the above-mentioned technical problems with conventional systems.

According to various embodiments, the instances of the agent application 112A-B may be programmed to communicate via a voice interface 116 and/or a chatbot interface 117. The voice interface 116 is configured to generate audible speech such that the agent application 112 may engage in conversations with another party (e.g., another instance of the agent application 112, a user of another instance of the agent application 112, etc.) to negotiate parameters for an agreement. The voice interface 116 may further convert received speech to text (e.g., based on a language processing algorithm 119) to facilitate agreement negotiations. The chatbot interface 117 is configured to generate text statements such that the instances of the agent applications 112 may engage in conversations via the generated text, e.g., to negotiate parameters for an agreement. For example, the chatbot interface 117 of agent application 112A may programmatically engage in text-based communications with the chatbot interface 117 of the agent application 112B. In some embodiments, a user of the agent application 112B may provide text (or speech) input via the chatbot interface 117 to communicate with the agent application 112A to negotiate parameters for an agreement. More generally, the voice interface 116 and the chatbot interface 117 allow the agent application 112 to convincingly simulate how a human would behave as a conversational partner, e.g., during agreement negotiations. Although the voice interface 116 and chatbot interface 117 are used as illustrative examples herein, the instances of the agent application 112A-B may communicate according to any other type of communications format.

As shown, the host system 103 includes one or more artificial intelligence (AI) algorithms 113, one or more AI datasets 114, one or more computing models 115, a data store of rules 118, and one or more language processing algorithms 119. Although not depicted for the sake of clarity, the client system 101 may also include the AI algorithms 113, AI datasets 114, computing models 115, rules 118, and language processing algorithms 119 (e.g., to act as a host instance of the agent application 112A). The AI algorithms 113 are representative of any type of artificial intelligence algorithm, such as machine learning algorithms, neural network algorithms, computer vision algorithms, classifiers, and the like. During a training phase, the AI algorithms 113 may process a training dataset (e.g., the AI dataset 114) to generate one or more computing models 115. The computing models 115 are representative of any type of model generated by an AI algorithm 113, such as machine learning models, neural networks, decision trees, and the like. In operation, the agent application 112 may leverage the computing models 115 to negotiate agreement parameters.

For example, the AI dataset 114 may include transcripts of prior negotiation sessions, and parameters of prior agreements generated based on the prior negotiation sessions. The AI algorithms 113 may process the AI dataset 114 to generate computing models 115 that specify model parameters which allow the agent application 112 to engage in improved negotiations (e.g., with fewer required steps, in less amount of time, using fewer computing resources) relative to negotiating without the computing models 115. For example, the AI algorithms 113 may identify features in the AI dataset 114 which allow the AI algorithms 113 to generate weights for each feature in the computing models 115. The agent application 112 may then use the feature weights in the computing models 115 when negotiating agreement parameters. The feature weights may also incentivize the agent application 112 to complete negotiations as quickly as possible (e.g., using the fewest possible steps to completion).

As another example, the agent application 112 may use the computing models 115 to analyze parameters of existing agreements. As part of the analysis, the agent application 112 may determine that more favorable terms for an existing agreement can be obtained, and the existing agreement should be renegotiated. The agent application 112 may then orchestrate the renegotiation (e.g., by contacting another instance of the agent application 112, sending another party of the agreement an invitation to renegotiate the agreement via the agent application 112, etc.). Furthermore, as new agreements are reached, the parameters and transcript of the new agreements may be added to the AI dataset 114. The AI algorithm 113 may then process the updated AI dataset 114 to retrain the computing models 115 as new agreements are reached.

The rules 118 are representative of any number and type of rules used by the agent application 112 to negotiate agreements, generate parameters, and/or analyze received parameters. For example, the rules 118 may include price rules (e.g., minimum acceptable prices, maximum acceptable prices, desired prices, interest rates, financing terms, etc.), asset rules (e.g., desired numbers of goods, available numbers of goods for sale, desired attributes of goods, properties, and/or services, etc.), time rules (e.g., deadlines for delivery, performance, etc.), action rules (e.g., desired actions, desired performance characteristics, etc.). For example, in negotiating an agreement to purchase a good, the rules 118 may specify a minimum price at which the seller is willing to sell the good, a maximum price a buyer is willing to pay for the good, a time by which the seller can deliver the good, and a time by which the buyer must receive the good. More generally, the rules 118 may include rules and data describing a plurality of different types of goods (e.g., identifiable by a SKU), services, assets, properties, etc.

Using the rules 118 and/or the computing models 115, the agent application 112 negotiates agreements that meet the rules for the subject matter of the agreement. For example, the agent application 112A may receive an offer to purchase goods at a price of $1,000 from the agent application 112B (or another instance of the agent application 112A). The agent application 112A may compare the received price to one or more threshold values (e.g., an acceptable price range) for purchasing the goods in the rules 118. If the received price satisfies the thresholds specified in the rules 118, the agent application 112A may accept the price. However, if the received price does not satisfy one or more threshold values (e.g., is outside the acceptable price range), the agent application 112A may generate a modified price for the goods based on the rules 118 and the computing models 115, where the modified price satisfies the threshold values and is within the acceptable price range.

The rules 118 may also include parameter templates specifying parameter types and rules for a given asset, such as price, quantity, interest rate, etc. Using the parameter template and associated rules, the agent application 112 programmatically negotiates parameter values for each of the parameters in the template. Doing so allows the agent application 112 to negotiate a complete agreement in compliance with the rules 118, ensuring that values for all parameters specified in the parameter templates have been negotiated.

Once parameter values have been negotiated for the agreement, the agent application 112 may generate a transcript of the communications (e.g., all text and/or voice statements between the agent applications 112A-B). In at least one embodiment, the language processing algorithms 119 are used to generate the transcript. One example of a language processing algorithm 119 is a speech-to-text natural language processing algorithm used to convert speech (e.g., communicated via the voice interface 116) to text. The transcript may then be stored as part of the smart contract 130 and used as proof of the negotiated terms between the parties to the agreement. The language processing algorithms 119 may further generate executable code statements based on the generated transcript. In one embodiment, the language processing algorithms 119 generate a parse tree of the transcripts to identify parameters, actions, conditions, etc., and generate the corresponding executable code statements. The executable code statements may be stored as part of the smart contract 130 in the blockchain 105.

The executable code statements may execute periodically (or as associated times and/or dates occur) to determine whether the terms of the agreement have been fulfilled. For example, if a smart contract 130 specifies that a mortgage payment is due on January 1, the executable code may execute on January 1 (or January 2, etc.) to determine whether the mortgage payment was made. In one embodiment, transaction data 121 from the data sources 120 is used to determine whether the mortgage payment (or other agreement terms have been fulfilled). For example, a financial institution of the mortgagee and/or the mortgagor may provide financial transaction data 121 as a data source 120. The transaction data 121 may reflect payments by the mortgagor to the mortgagee under the terms of the mortgage. The executable code of the smart contract 130 may access the financial transaction data 121 to determine whether the January 1 mortgage payment was made. If the payment was made, the executable code of the smart contract 130 may store an indication of the payment (e.g., in the smart contract 130, or in another location of the blockchain 105). If the financial transaction data 121 reflects that the payment was not timely made, the executable code of the smart contract 130 may generate an indication that the mortgagor is in breach and transmit a notification to an interested party (e.g., the mortgagee).

In another embodiment, the executable code in the smart contract 130 may receive votes indicating whether the agreement (or a parameter thereof) has been performed. The executable code may then tally the votes to determine whether the agreement has been performed. For example, the mortgagor, mortgagee, and a neutral third party may each receive a respective cryptographic key as parties to the mortgage agreement. The parties may then use the respective keys to cast votes indicating whether the agreement has been fulfilled. For example, the mortgagor may cast a vote indicating the January 1 mortgage payment has been timely made. Similarly, the mortgagee may cast a vote indicating the January 1 mortgage payment was not timely made. In some embodiments, each vote (and associated key) is weighted. For example, the mortgagor and mortgagee may each have weights of 1.0 applied to their respective votes, while the third party has a weight of 3.0 applied to its vote. Doing so allows the third party to break ties between the mortgagor and mortgagee based on an analysis of the transaction data 121. For example, if the transaction data 121 reflects that the payment was made, the third party may cast a vote indicating that the payment was made. The weight of 3.0 applied to the vote of the third party ensures that even if the mortgagee erroneously voted that the payment was not made, the correct outcome is determined by the executable code (e.g., a total 4-1 vote in favor of the payment being made).

Network 111 may be configured to provide communications between components of FIG. 1. For example, network 111 may be any type of network (including infrastructure) that provides communications, exchanges information, and/or facilitates the exchange of information, such as the Internet, a Local Area Network, or other suitable connection(s) that enables system 100 to send and receive information between the components of system 100. Therefore, once generated, a smart contract 130 may be replicated to other copies of the blockchain 105 via the network 111.

FIG. 2A illustrates an embodiment of a transcript 200 generated by the system 100. Generally, the transcript 200 reflects negotiations for the sale of a good by the instances of the agent application 112A, 112B. As shown, the instances of the agent application 112A, 112B negotiate parameters for price, quantity, time of delivery, and time of payment. As stated, the instances of the agent application 112A, 112B engage in negotiations according to the rules 118 and/or the computing models 115. Doing so ensures that the associated rules 118 are satisfied for the sale and purchase of the good. For example, as shown, the instances of the agent application 112A, 112B negotiate the price and quantity via a series of statements. The price and quantity terms generated by the instances of the agent application 112A, 112B are based on the rules 118 and the computing models 115. The agent application 112A is automated and needs no human input to engage in negotiations and/or communications after the initial training. Therefore, the statements made by the agent application 112 are programmatically generated based on the rules 118 and the computing models 115. Similarly, the instance of the agent application 112B may be completely automated. However, in some embodiments, the instance of the agent application 112B may be controlled by a user to generate the statements reflected in the transcript 200.

Although a good is used as an example in FIG. 2A, as stated, any good, service, property, and/or computing resource may be programmatically sold and/or leased. As another example, the agent application 112 may itself be a service sold and/or leased to a customer. The negotiations (e.g., between the agent application 112A and a user) may then reflect parameters of the sale or lease of the services provided by the agent application 112. For example, the terms of the service agreement may guarantee the buyer (or lessee) of the services a minimum number of sales when deploying their own instance of the agent application 112A, a minimum dollar amount of sales, a minimum number of website visits, and a minimum amount of generated advertising revenue.

FIG. 2B depicts an example of an executable statement 201 generated based on a portion of the transcript 200 of FIG. 2A. Specifically, the executable statement 201 includes logic structures reflecting that the buyer's payment must be received by the due date of Apr. 29, 2018. If the payment is not received by the due date, the executable statement 201 is executable to determine that the buyer is in breach. As stated, the language processing algorithms 119 may generate the executable statement 201, e.g., based on tokenization, if/then constructs, parse trees, and the like. The executable statement 201 may be generated to conform with any type of programming language or execution environment, and the syntax depicted in FIG. 2B should not be considered limiting of the disclosure. As stated but not depicted in FIG. 2B, executable statements 201 may be generated for each parameter of an agreement based on the corresponding transcript 200.

Figure 3:
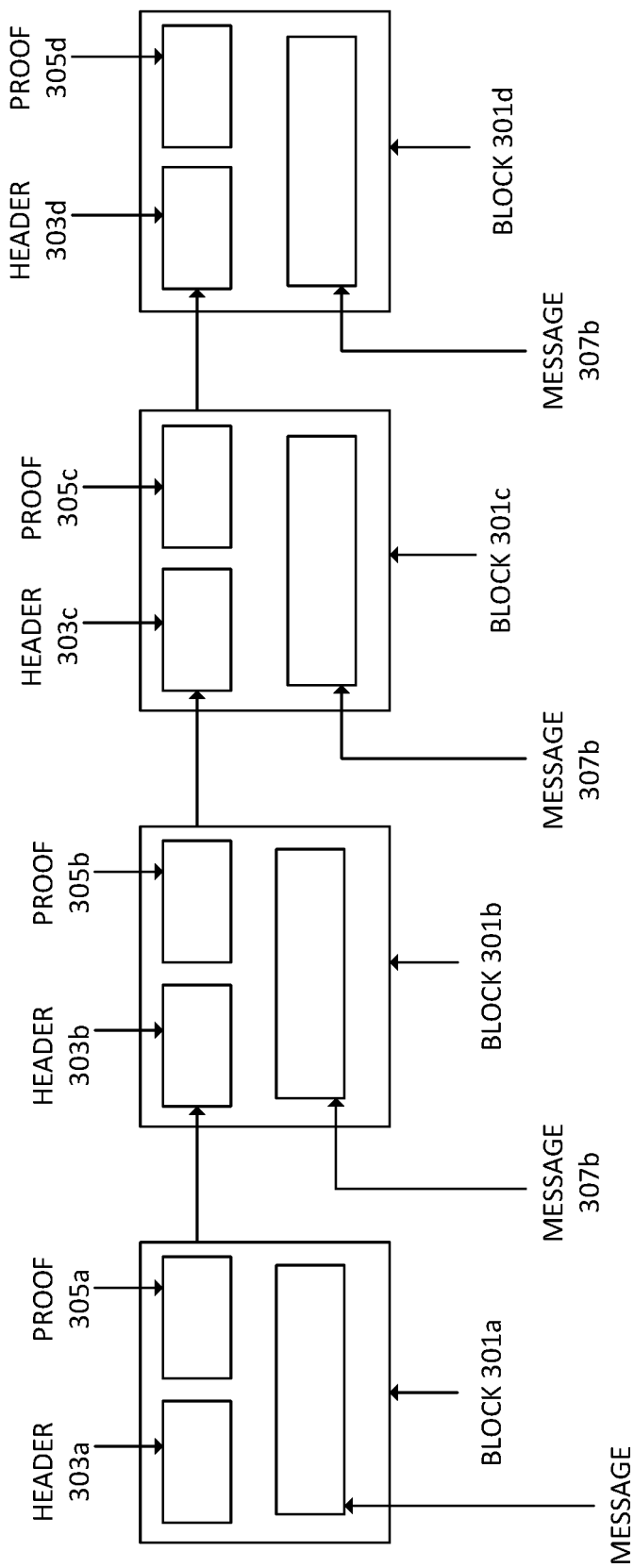
FIG. 3 depicts a logical model of an exemplary blockchain.

FIG. 3 depicts a logical model 300 of an exemplary blockchain 105, consistent with disclosed embodiments. Blockchain 105 may comprise many such blockchains maintained by many different systems (e.g., host systems 103, or other systems). Such exemplary blockchains may comprise blocks, such as blocks 301a-301d. Blocks may include messages, such as message 307b and message 307d. Generally, blocks may include a header, such as headers 302a-302d, which uniquely identifies each block. The headers 302a-302d may include a hash value generated by a hash function. A hash function is any function that can be used to map input data of arbitrary size to a hash value of a fixed size. For example, a header may include at least one of the previous block's hash value, a hash value generated based on any messages in the block (e.g., a Merkle root), and a timestamp. Consistent with disclosed embodiments, system 100 may require that blocks added to blockchain 105 satisfy at least one of a proof-of-work condition (e.g., a proof 305a-305d) and a digital signature condition. For example, the headers 302a-302d may include a nonce chosen to ensure the header satisfies the proof-of-work condition. As a non-limiting example, the proof-of-work condition may require the hash of the header fall within a predetermined range of values. As an additional example, the header may be digitally signed with a cryptographic key of an authorized system, and the digital signature may be included in the header. This digital signature may be verified using a key available to the members of system 100. Generally, one or more designated components of the system 100 (e.g., the agent application 112, the blockchain 105, etc.) may generate blocks 301 including headers 302, proofs 305, and messages 307 for smart contracts 130 programmatically generated by the system 100.

Figure 4:
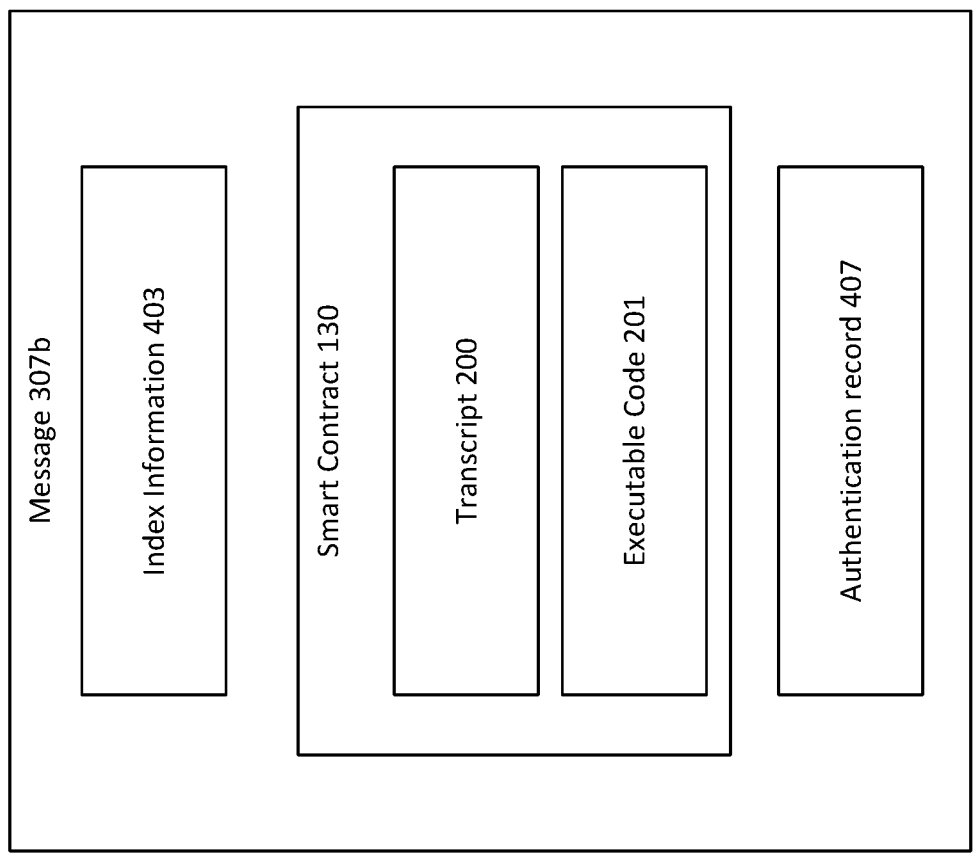
FIG. 4 depicts a logical model of a message stored in a blockchain.

FIG. 4 depicts a logical model of a message 307b stored in a blockchain (e.g., an element of blockchain 105), consistent with disclosed embodiments. In some embodiments, a designated component of the system 100 (e.g., the agent application 112, the blockchain 105, etc.) generates blockchain messages such as the message 307b. In some embodiments, message 307b may comprise index information 403. In certain aspects, index information 403 may comprise information identifying a user. For example, index information 403 may be at least one of a full name, email address, phone number, or other non-sensitive personal information of the user. In various aspects, index information 403 may include one or more references to earlier blocks in the blockchain 105. For example, index information 403 may include one or more references to one or more earlier blocks associated with the same user. A reference may include, as a non-limiting example, a hash of a preceding block in the blockchain associated with the same user. In some embodiments, index information 403 may be obfuscated or encrypted according to methods known to one of skill in the art. For example, index information 403 may be encrypted with a cryptographic key. As an additional example, index information 403 may comprise a hash of the at least one of a full name, email address, phone number, or other non-sensitive personal information of the user.

Message 307b may comprise smart contract 130, consistent with disclosed embodiments. As shown, smart contract 130 may include a transcript 200 and executable code 201. The transcript 200 reflects each statement communicated by each party to the agreement (e.g., via the agent application 112A, 112B and/or via other applications and/or communication formats). The executable code 201 includes executable code to monitor and enforce each parameter of the smart contract 130. The smart contract 130 may further include data (not pictured) identifying parties to the agreement, and any other type of parameter associated with the agreement. In various aspects, the smart contract 130 may be obfuscated or encrypted according to methods known to one of skill in the art. For example, smart contract 130 may be encrypted with a cryptographic key.

Message 307b may comprise authentication record 407, consistent with disclosed embodiments. In some aspects, authentication record 407 may comprise information enabling subsequent auditing of transactions. For example, authentication record 407 may identify at least one of host system 103, a commercial institution associated with host system 103, an entity associated with client system 101, a purpose of the authentication request, a result of the authentication request, and information related to the authentication request. In some aspects, a purpose of the authentication request may include the negotiation and/or creation of a smart contract 130, the monitoring and/or enforcement of the terms of a smart contract 130, creation of a relationship (e.g., a financial relationship, such as a bank account, brokerage account, credit card account, and/or loan account) with a commercial institution associated with host system 103, or the performance of a service by host system 103 (e.g., negotiating agreements via the agent application 112, voting on performance of terms of smart contracts 130, performing transactions in a financial account associated with the user, cashing a check provided by the user, and/or selling a cashier's check to the user). As would be appreciated by one of skill in the art, the above exemplary authentication purposes are not intended to be limiting. In some aspects, a result of the authentication request may include whether the purpose of the authentication request was achieved. For example, when the purpose of the authentication request was creation of a relationship, the result of the authentication request may indicate whether the relationship was created. As another example, when the purpose of the authentication request was performance of a service specified as a parameter of a smart contract 130, the result of the authentication request may indicate whether the service was timely performed. As would be appreciated by one of skill in the art, the above exemplary authentication results are not intended to be limiting. In some aspects, information related to the authentication request may include additional contact information, demographic information, financial information, or similar personal information provided in connection with the authentication request. In some aspects, such information may merely indicate that such information was provided, and/or provide a location where such information may be obtained. In some aspects, authentication record 407 may be obfuscated or encrypted according to methods known to one of skill in the art. For example, authentication record 407 may be encrypted with a cryptographic key.

Cryptographic keys may be used to encrypt elements of messages in blocks, consistent with disclosed embodiments. In some aspects, such cryptographic keys may be associated with members of the system 100 (e.g., host systems 103, client systems 101, instances of agent application 112A, instances of agent application 112B, parties to agreements (including neutral third parties), etc.). In various aspects, at least some of the cryptographic keys may be associated with authorized systems. Corresponding cryptographic keys may be available to decrypt the encrypted message elements, consistent with disclosed embodiments. For example, when an element of a message in a block is encrypted with a symmetric key, the same symmetric key may be available for decrypting the encrypted element. As another example, when an element of a message in a block is encrypted with a private key, a corresponding public key may be available for decrypting the encrypted element. In some aspects, the corresponding cryptographic keys may be available to members of authentication system (e.g., host systems 103, client systems 101, instances of agent application 112A, instances of agent application 112B, etc.). As stated, such cryptographic keys may be used to cast votes to indicate whether performance of agreement obligations or parameters has been completed.

Figure 5:
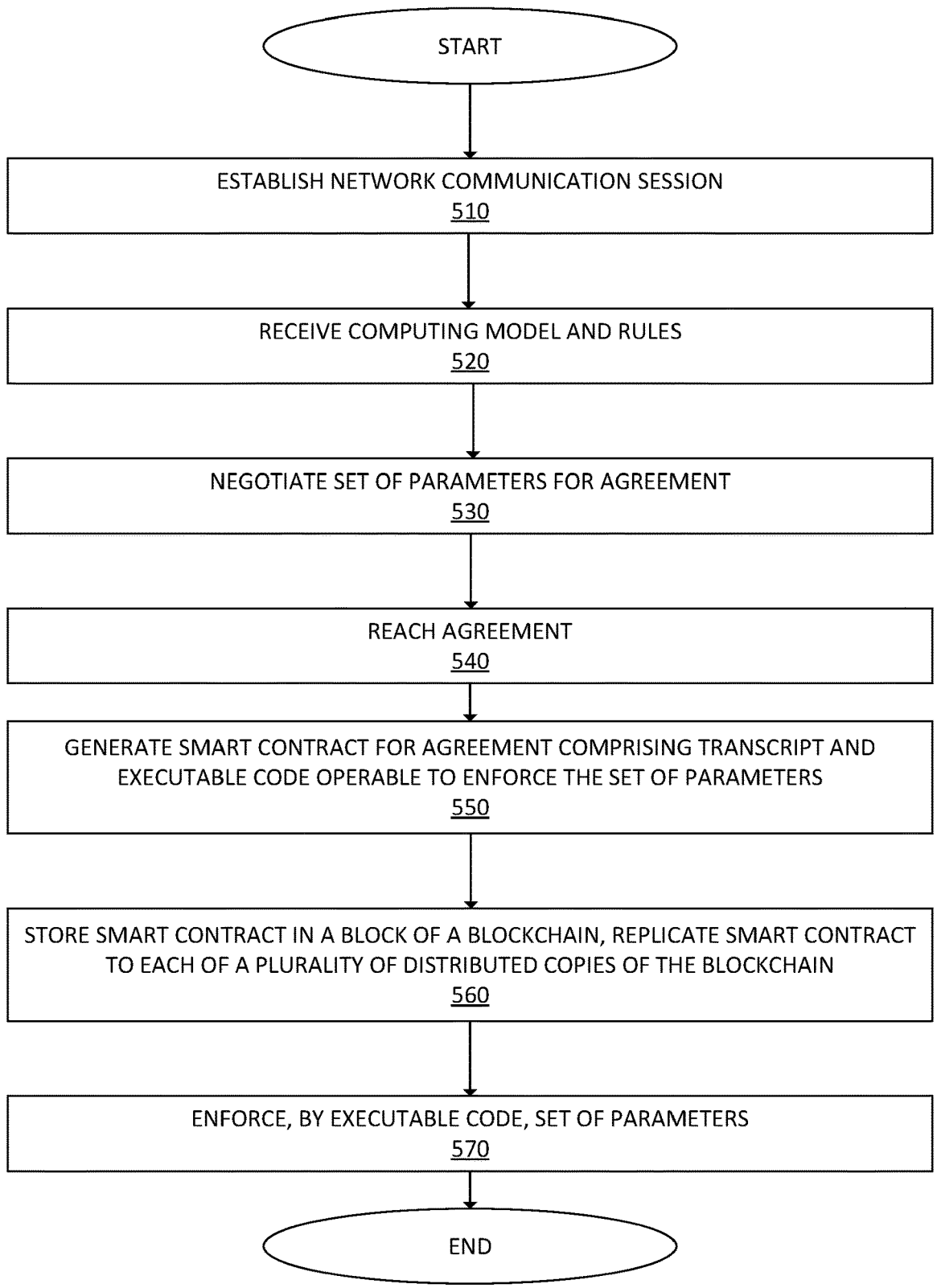
FIG. 5 illustrates an embodiment of a first logic flow.

FIG. 5 illustrates an embodiment of a logic flow 500. The logic flow 500 may be representative of some or all of the operations executed by one or more embodiments described herein. Embodiments are not limited in this context.

In the illustrated embodiment shown in FIG. 5, the logic flow 500 may begin at block 510. At block 510 "establish network communication session", an instance of the agent application 112A on the host system 103 and an instance of the agent application 112B may establish a network communication session via the network 111. In establishing the network communication session, the instances of the agent application 112A-B may exchange identification information (e.g., cryptographic keys, unique identifiers, credentials, etc.) to identify the parties to a potential agreement, as well as identification information (e.g., a serial number, SKU, model number, or other identifier) for a desired good, service, property, etc., for a potential agreement. As stated, the instance of the agent application 112A is completely automated and requires no user input. However, the instance of the agent application 112B may be automated, or may be controlled by a user. At block 520 "receive computing model and rules", the agent application 112A (and/or agent application 112B) may receive the computing models 115 and the rules 118. The rules 118 may be for a good, service, property, etc., that is subject to negotiations, e.g., for sale and/or lease. At block 530 "negotiate set of parameters for agreement", the instances of the agent application 112A-B may negotiate parameters for an agreement according to the rules 118 and/or the computing models 115. As stated, the rules 118 may include a template defining the required types of parameters for a given type of agreement. For example, a loan agreement may have a template requiring at least a loan amount parameter, collateral parameter, repayment period, interest rate, and the like. The template may specify associated rules and/or criteria for each parameter in the template. Therefore, the instances of the agent application 112A-B may negotiate values for the loan amount, repayment period, collateral, interest rate, etc., according to the rules 118 and/or the computing models 115.

At block 540 "reach agreement", each party to the agreement communicates acceptance to the parameters negotiated at block 520, thereby entering an enforceable contract. For example, the user of agent application 112B may communicate acceptance of the parameters, while the agent application 112A may programmatically accept all parameters upon determining each parameter satisfies an associated rule specified in the rules 118. At block 550 "generate smart contract for agreement comprising transcript and executable code operable to enforce the set of parameters", one or more of the agent application 112A and agent application 112B may generate a smart contract 130 comprising a generated transcript 200 and executable code 201. The executable code 201 may be operable to enforce each parameter of the agreement when deployed to the blockchain 105.

At block 560 "store the smart contract in a block of a blockchain, replicate smart contract to each of a plurality of distributed copies of the blockchain" the smart contract 130 generated at block 540 is stored in one or more blocks 301 of the blockchain 105. Furthermore, the smart contract 130 is replicated to each of a plurality of distributed copies of the blockchain 105. At block 570 "enforce, by executable code, set of parameters" the agreed upon parameters of the smart contract 130 are enforced by the executable code 201. As stated, the executable code 201 may periodically execute, or may execute upon specified events (e.g., received transaction data 121, at specified times, etc.), and determine whether the parameters of the smart contract 130 have been fulfilled. Doing so allows for automated enforcement, monitoring, and auditing of the smart contract 130.

Figure 6:
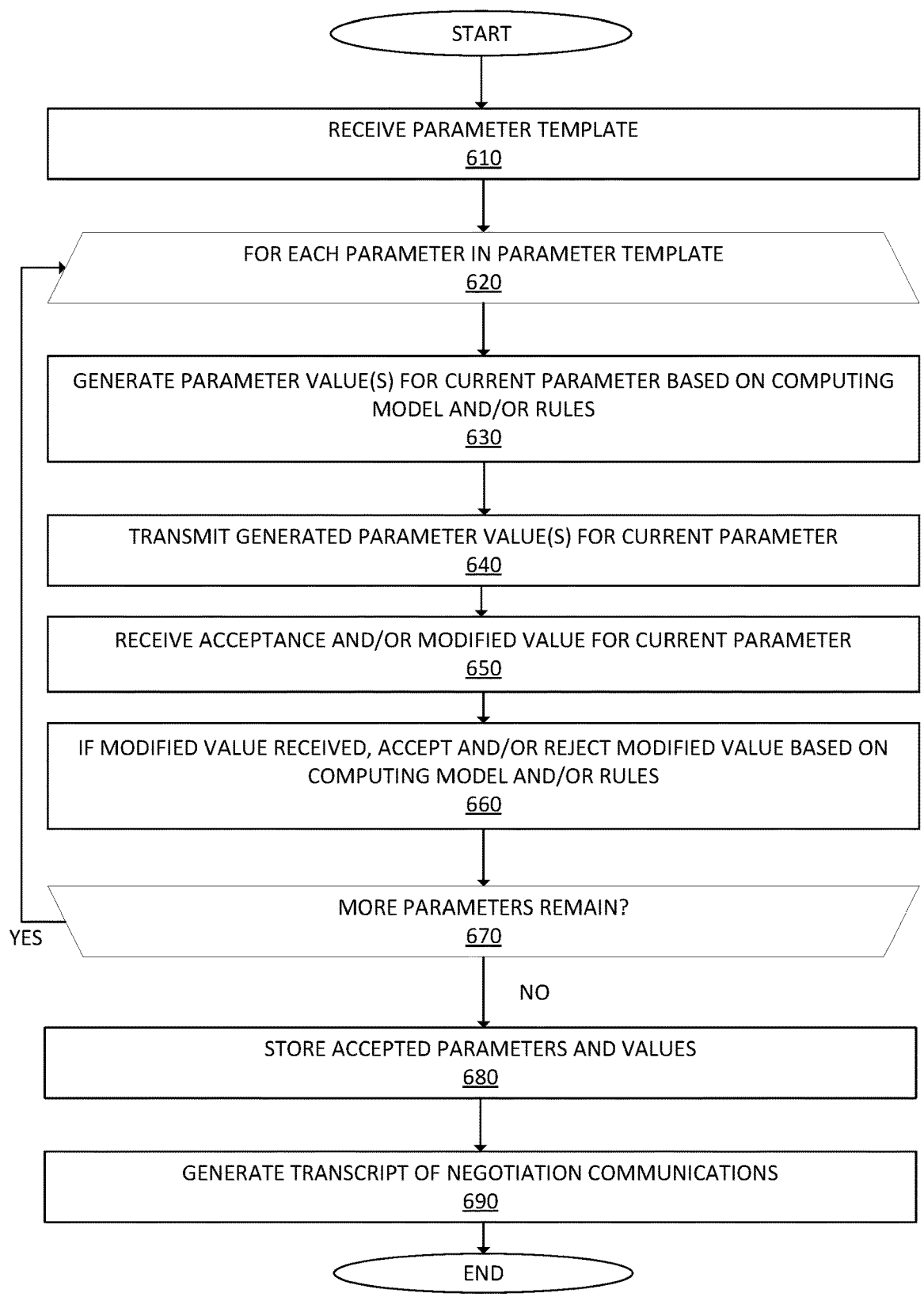
FIG. 6 illustrates an embodiment of a second logic flow.

FIG. 6 illustrates an embodiment of a logic flow 600. The logic flow 600 may be representative of some or all of the operations executed by one or more embodiments described herein. For example, the logic flow 600 may represent some or all of the operations executed by the agent applications 112A, 112B to negotiate agreement parameters at block 520. Embodiments are not limited in this context.

In the illustrated embodiment shown in FIG. 6, the logic flow 600 may begin at block 610. At block 610 "receive parameter template", the agent application 112A (and/or agent application 112B) may receive a parameter template from the rules 118 for the current agreement. The parameter template may be selected based on the subject matter of the agreement (e.g., a good, service, property, etc.). The parameter template may specify a plurality of different parameters for which values (or terms) need to be negotiated (in accordance with corresponding rules 118). At block 620, a loop including blocks 630-670 is executed for each parameter in the parameter list received at block 610. At block 630 "generate parameter value(s) for current parameter based on computing model and/or rules", the agent application 112A (and/or agent application 112B) may generate a parameter value for the current parameter based on the rules 118 and/or the computing models 115. For example, the agent application 112A may generate an offer price that is within a range of acceptable prices for a good specified by the rules 118. As another example, the agent application 112A may generate an interest rate value that is within a range of acceptable interest rates for a type of loan specified in the rules 118.

At block 630 "transmit generated parameter value(s) for current parameter", the value(s) generated at block 620 are transmitted via the network 111 for review. For example, the agent application 112A may transmit the interest rate value to the agent application 112B via the network 111. At block 640 "receive acceptance and/or modified value for current parameter", acceptance and/or a modified value for the current parameter is received. For example, the agent application 112A may receive an indication of acceptance of the interest rate from the agent application 112B. As another example, the agent application 112A may receive a modified value for the interest rate from the agent application 112B (e.g., a lower interest rate desired by the agent application 112B). At block 660 "if modified value received, accept and/or reject modified value based on computing model and/or rules", the agent application 112A accepts and/or rejects a modified value received from the agent application 112B at block 650 based on the computing model 115 and/or the rules 118. For example, if the modified value of the interest rate is outside of a range of interest rates specified in the rules 118, the agent application 112A may reject the modified interest rate. The agent application 112A may then optionally generate a modified interest rate value (e.g., returning to block 630) to continue negotiations. If, however, the modified interest rate received at block 650 is within the range of interest rates permitted by the rules 118, the agent application 112A may transmit an indication of acceptance of the modified interest rate to the agent application 112B.

At block 670, the agent application 112A determines whether more parameters remain in the parameter template. If more parameters remain, the logic flow returns to block 620. Otherwise, the logic flow proceeds to block 680, where the agent application 112A stores an indication of all accepted parameters and associated values. At block 690, the agent application 112A (and/or the agent application 112B) generates a transcript 200 of the communications transmitted via the network by the agent application 112A and the agent application 112B.

Figure 7:
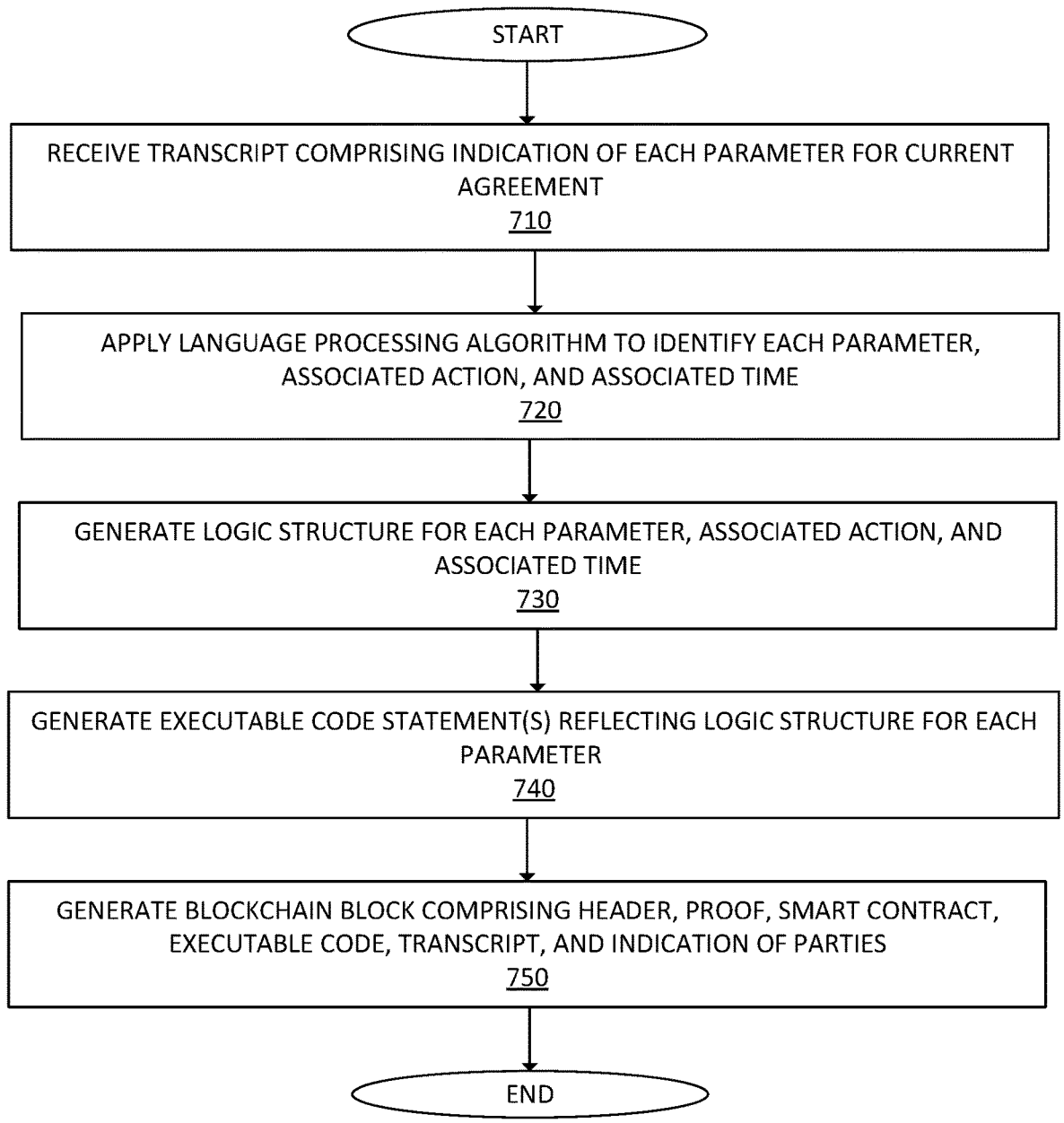
FIG. 7 illustrates an embodiment of a third logic flow.

FIG. 7 illustrates an embodiment of a logic flow 700. The logic flow 700 may be representative of some or all of the operations executed by one or more embodiments described herein. For example, the agent application 112A (and/or the agent application 112B) may execute some or all of the operations of logic flow 700 to generate executable code 201 to enforce a smart contract 130. Embodiments are not limited in this context.

In the illustrated embodiment shown in FIG. 7, the logic flow 700 may begin at block 710. At block 710 "receive transcript comprising indication of each parameter for current agreement", the agent application 112A receives the transcript 200 generated at block 690. At block 720 "apply language processing algorithm to identify each parameter, associated action, and associated time", the agent application 112A applies one or more language processing algorithms 119 to the transcript to identify each parameter of the agreement, an action associated with the parameter (if applicable), and a time associated with the parameter (if applicable). For example, the language processing algorithm 119 may generate a parse tree indicating when a seller is required to deliver title to a parcel of land. At block 730 "generate logic structure for each parameter, associated action, and associated time", the language processing algorithms 119 may generate a logic structure (e.g., if/then statements, for loops, while loops, conditional statements, etc.) for each parameter, associated action, and associated time identified at block 720.

At block 740 "generate executable code statement(s) reflecting logic structure for each parameter", the language processing algorithms 119 may generate executable code statements 201 reflecting the logic structures generated at block 730. For example, the language processing algorithms 119 may convert the logic structure to comply with a syntax of any number of different programming languages. At block 750 "generate blockchain block comprising header, proof, smart contract, executable code, transcript, and indication of parties", the blockchain 105 (and/or another designated component of the system 100) may generate one or more blocks 301 for the blockchain 105, the one or more blocks 301 including a header 303, proof 305, and a message 307. The message 307 may include the smart contract 130, which includes the executable code 201 and the transcript 200, as well as an indication of the parties to the agreement (including any third parties). As stated, the blocks 301 may be added to the blockchain 105 and replicated across a number of distributed copies of the blockchain 105.

Figure 8:
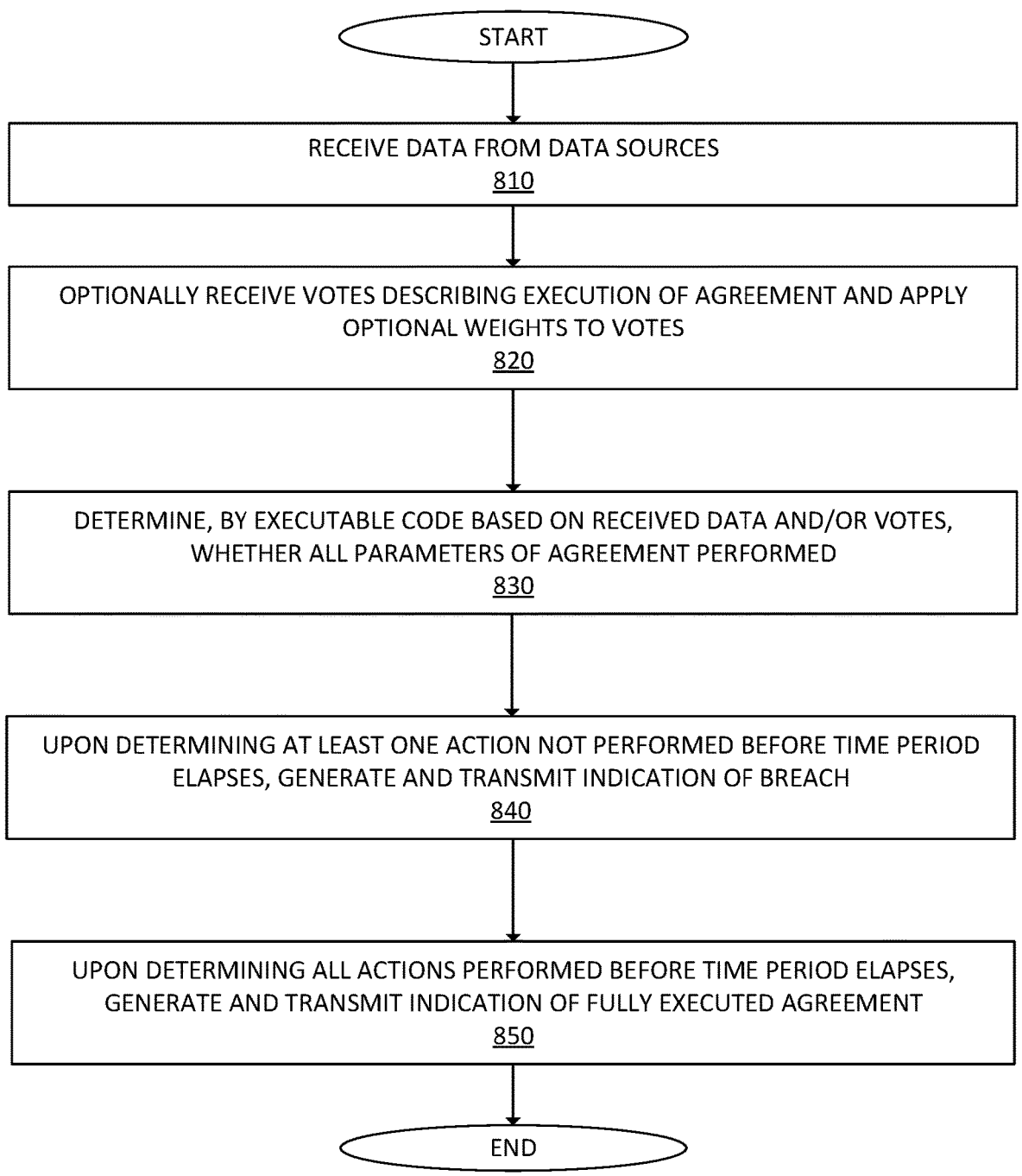
FIG. 8 illustrates an embodiment of a fourth logic flow.

FIG. 8 illustrates an embodiment of a logic flow 800. The logic flow 800 may be representative of some or all of the operations executed by one or more embodiments described herein. For example, the executable code 201 may execute one or more of the operations of logic flow 800 to enforce smart contracts 130. In other embodiments, the agent application 112 may perform one or more of the operations of logic flow 800 to enforce smart contracts 130. Embodiments are not limited in this context.

In the illustrated embodiment shown in FIG. 8, the logic flow 800 may begin at block 810. At block 810 "receive data from data sources", the executable code 201 may receive transaction data 121 from the data sources 120. For example, the executable code 201 may receive payment data, deed recordation data, shipment data, sensor data reflecting the presence of service providers at a designated location the service is to be rendered, and the like. At block 820 "optionally receive votes describing execution of agreement and apply optional weights to votes", the executable code 201 may receive votes from each party to the agreement, where the votes reflect whether the agreement (or portions thereof) has been executed. For example, a landlord and a tenant may each provide a vote indicating a tenant timely paid monthly rent. As stated, each vote may be associated with a private key and a weight, and the weights may be applied to each vote before being summed by the executable code 201. Doing so allows the executable code 201 to determine whether the agreement (or portions thereof) has been executed, or whether one or more parties are in breach.

At block 830 "determine, by executable code based on received data and/or votes, whether all parameters of agreement performed", the executable code 201 determines whether all parameters of the agreement have been performed (e.g., those parameters having an associated date and/or time for performance that have occurred). At block 840 "upon determining at least one action not performed before time period elapses, generate and transmit indication of breach", the executable code 201 generates and transmits an indication of breach of the agreement upon determining at least one action (or other obligation) has not been performed. For example, if the transaction data 121 and/or the votes 121 reflect that the tenant did not timely pay the monthly rent, the executable code 201 determines that the tenant is in breach. The executable code 201 may then alert the landlord, the tenant, and/or other parties of the breach.

At block 850 "upon determining all actions performed before time period elapses, generate and transmit indication of fully executed agreement", the executable code 201 determines that all actions (or obligations) under the agreement have been timely performed (or completed). The executable code 201 may then generate and transmit an indication that the agreement has been fully executed. More generally, as the executable code 201 executes blocks 810-850, any data generated and/or received may be stored in the blockchain 105 and replicated to distributed copies of the blockchain 105 via the network 111.

Figure 9:
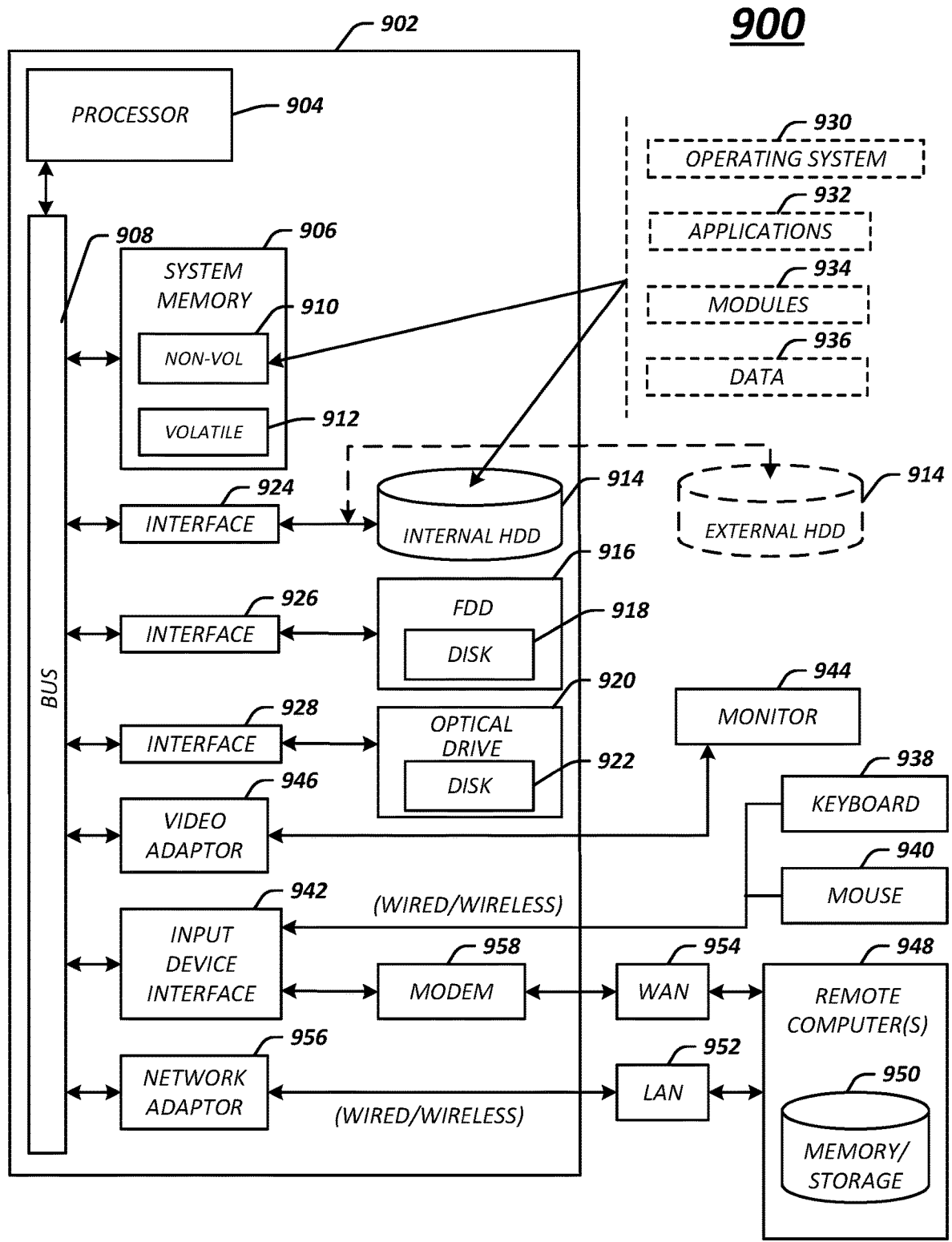
FIG. 9 illustrates an embodiment of a computing architecture.

FIG. 9 illustrates an embodiment of an exemplary computing architecture 900 comprising a computing system 902 that may be suitable for implementing various embodiments as previously described. In various embodiments, the computing architecture 900 may comprise or be implemented as part of an electronic device. In some embodiments, the computing architecture 900 may be representative, for example, of a system that implements one or more components of the system 100. In some embodiments, computing system 902 may be representative, for example, of the client system 101, host system 103, blockchain 105, and data sources 120 of the system 100. The embodiments are not limited in this context. More generally, the computing architecture 900 is configured to implement all logic, applications, systems, methods, apparatuses, and functionality described herein with reference to FIGS. 1-8.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 902 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 902.

As shown in FIG. 9, the computing system 902 comprises a processor 904, a system memory 906 and a system bus 908. The processor 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 904.

The system bus 908 provides an interface for system components including, but not limited to, the system memory 906 to the processor 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computing system 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies. The computing system 902 is generally is configured to implement all logic, systems, methods, apparatuses, and functionality described herein with reference to FIGS. 1-8.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 100, e.g., the agent application 112A, agent application 112B, AI algorithm 113, AI dataset 114, computing models 115, rules 118, and language processing algorithms 119.

A user can enter commands and information into the computing system 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computing system 902. In addition to the monitor 944, a computer typically includes other peripheral output devices, such as speakers, printers, and so forth.

The computing system 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computing system 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computing system 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computing system 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computing system 902, or portions thereof, can be stored in the remote memory/storage device 950. It will be appreciated that the network connections shown are exemplary and other means of establishing a communications link between the computers can be used.

The computing system 902 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method, comprising:
generating, by an agent executing on a processor, a transcript comprising statements generated by the agent and received by the agent, the statements collectively specifying a set of parameters for an agreement, wherein the agent comprises one of: (i) a chatbot, or (ii) a voice-enabled agent;
generating, by the agent based on a language processing algorithm applied to the statements of the transcript, executable code operable to enforce the set of parameters;
storing a smart contract comprising the transcript and the executable code in a block of a blockchain, the block of the blockchain replicated to a plurality of distributed copies of the blockchain;
receiving, by the executable code executing on a processor, a vote from each party to the agreement, each vote indicating whether an action of a first parameter of the set of parameters has occurred on or before a time of the first parameter has elapsed;
determining, by the executable code, that a sum of the votes received from each party to the agreement does not indicate whether the action of the first parameter has occurred on or before the time of the first parameter has elapsed;
receiving, by the executable code, a vote from a neutral party indicating whether the action of the first parameter has occurred on or before the time of the first parameter has elapsed;
applying, by the executable code, a respective weight to each received vote to determine whether the action of the first parameter has occurred on or before the time of the first parameter has elapsed, the respective weights comprising at least two different weight values; and
determining, by the executable code based on a sum of the weighted votes, that the action of the first parameter has been completed on or before the time of the first parameter has elapsed.

2. The method of claim 1, further comprising:
determining, by the agent, that a first parameter in the set of parameters has a value that does not meet a first rule, of a plurality of rules;
determining, by the agent based on a computing model and the first rule, a modified value for the first parameter;
determining, by the agent, that each parameter in the set of parameters, including the modified value for the first parameter, satisfies the associated rule of the plurality of rules;
transmitting, by the agent via a network, the modified value for the first parameter; and
receive, by the agent via the network, acceptance of the set of parameters including the modified value for the first parameter.

3. The method of claim 2, further comprising:
receiving, by the agent via the network, acceptance of the set of parameters including the modified value for the first parameter.

4. The method of claim 1, further comprising:
determining, by the executable code in the block of the blockchain, that the time for the first parameter has elapsed; and
transmitting an indication of completion of the action via a network.

5. The method of claim 1, wherein the executable code applies a first weight value of the at least two weight values to the votes received from each party to the agreement, wherein the executable code applies a second weight value of the at least two weight values to the vote received from the neutral party, wherein the first and second weight values comprise different weight values.

6. The method of claim 1, further comprising:
identifying a prior agreement;
analyzing a plurality of parameters of the prior agreement;
determining, based on the analysis, to re-negotiate the prior agreement; and
transmitting an indication to re-negotiate the prior agreement.

7. A system, comprising:
a processor; and
a memory storing instructions executable by the processor to:
generate, by an agent, a transcript comprising statements generated by the agent and received by the agent, the statements collectively specifying a set of parameters for an agreement, wherein the agent comprises one of: (i) a chatbot, or (ii) a voice-enabled agent;
generate, by the agent based on a language processing algorithm applied to the statements of the transcript, executable code operable to enforce the set of parameters;
store a smart contract comprising the transcript and the executable code in a block of a blockchain, the block of the blockchain replicated to a plurality of distributed copies of the blockchain;
receive, by the executable code, a vote from each party to the agreement, each vote indicating whether an action of a first parameter of the set of parameters has occurred on or before a time of the first parameter has elapsed;
determine, by the executable code, that a sum of the votes received from each party to the agreement does not indicate whether the action of the first parameter has occurred on or before the time of the first parameter has elapsed;

receive, by the executable code, a vote from a neutral party indicating whether the action of the first parameter has occurred on or before the time of the first parameter has elapsed;

apply, by the executable code, a respective weight to each received vote to determine whether the action of the first parameter has occurred on or before the time of the first parameter has elapsed, the respective weights comprising at least two different weight values; and determine, by the executable code based on a sum of the weighted votes, that the action of the first parameter has been completed on or before the time of the first parameter has elapsed.

8. The system of claim 7, the memory storing instructions executable by the processor to:

receive, by the agent, the set of parameters for the agreement;

determine, by the agent, that the set of parameters satisfies a plurality of rules; and transmit, by the agent via a network, an indication of acceptance of the set of parameters.

9. The system of claim 7, the memory storing instructions executable by the processor to:

generate, by the agent, the smart contract for the agreement.

10. The system of claim 7, the memory storing instructions executable by the processor to:

determine, by the agent, that a first parameter in the set of parameters has a value that does not meet a first rule, of a plurality of rules;

determine, by the agent based on a computing model and the first rule, a modified value for the first parameter;

determine, by the agent, that each parameter in the set of parameters, including the modified value for the first parameter, satisfies the associated rule of the plurality of rules;

transmit, by the agent via a network, the modified value for the first parameter; and receive, by the agent via the network, acceptance of the set of parameters including the modified value for the first parameter.

11. The system of claim 7, wherein the executable code applies a first weight value of the at least two weight values to the votes received from each party to the agreement, wherein the executable code applies a second weight value of the at least two weight values to the vote received from the neutral party, wherein the first and second weight values comprise different weight values.

12. The system of claim 7, the memory storing instructions executable by the processor to:

determine, by the executable code in the block of the blockchain, that the time for the first parameter has elapsed; and transmit an indication of completion of the action via a network.

13. The system of claim 7, the memory storing instructions executable by the processor to:

identify a prior agreement;

analyze a plurality of parameters of the prior agreement;

determine, based on the analysis, to re-negotiate the prior agreement; and transmitting an indication to re-negotiate the prior agreement.

14. A non-transitory computer-readable storage medium storing computer-readable program code executable by a processor to:

generate, by an agent, a transcript comprising statements generated by the agent and received by the agent, the statements collectively specifying a set of parameters for an agreement, wherein the agent comprises one of: (i) a chatbot, or (ii) a voice-enabled agent;

generate, by the agent based on a language processing algorithm applied to the statements of the transcript, executable code operable to enforce the set of parameters;

store a smart contract comprising the transcript and the executable code in a block of a blockchain, the block of the blockchain replicated to a plurality of distributed copies of the blockchain;

receive, by the executable code, a vote from each party to the agreement, each vote indicating whether an action of a first parameter of the set of parameters has occurred on or before a time of the first parameter has elapsed;

determine, by the executable code, that a sum of the votes received from each party to the agreement does not indicate whether the action of the first parameter has occurred on or before the time of the first parameter has elapsed;

receive, by the executable code, a vote from a neutral party indicating whether the action of the first parameter has occurred on or before the time of the first parameter has elapsed;

apply, by the executable code, a respective weight to each received vote to determine whether the action of the first parameter has occurred on or before the time of the first parameter has elapsed, the respective weights comprising at least two different weight values; and determine, by the executable code based on a sum of the weighted votes, that the action of the first parameter has been completed on or before the time of the first parameter has elapsed.

15. The non-transitory computer-readable storage medium of claim 14, further comprising computer-readable program code executable to:

receive, by the agent, the set of parameters for the agreement;

determine, by the agent, that the set of parameters satisfies a plurality of rules; and transmit, by the agent via a network, an indication of acceptance of the set of parameters.

16. The non-transitory computer-readable storage medium of claim 14, further comprising computer-readable program code executable to:

generate, by the agent, the smart contract for the agreement.

17. The non-transitory computer-readable storage medium of claim 14, further comprising computer-readable program code executable to:

determine, by the executable code in the block of the blockchain, that the time for the first parameter has elapsed; and transmit an indication of completion of the action via a network.

18. The non-transitory computer-readable storage medium of claim 14, further comprising computer-readable program code executable to:

determine, by the agent, that a first parameter in the set of parameters has a value that does not meet a first rule, of a plurality of rules;

determine, by the agent based on a computing model and the first rule, a modified value for the first parameter;

determine, by the agent, that each parameter in the set of parameters, including the modified value for the first parameter, satisfies the associated rule of the plurality of rules;

transmit, by the agent via a network, the modified value for the first parameter; and receive, by the agent via the network, acceptance of the set of parameters including the modified value for the first parameter.

19. The non-transitory computer-readable storage medium of claim 14, wherein the executable code applies a first weight value of the at least two weight values to the votes received from each party to the agreement, wherein the executable code applies a second weight value of the at least two weight values to the vote received from the neutral party, wherein the first and second weight values comprise different weight values.

20. The non-transitory computer-readable storage medium of claim 14, further comprising computer-readable program code executable to:

identify a prior agreement;

analyze a plurality of parameters of the prior agreement;

determine, based on the analysis, to re-negotiate the prior agreement; and transmitting an indication to re-negotiate the prior agreement.

\* \* \* \* \*